(12) United States Patent
Lee

(10) Patent No.: US 9,878,704 B2
(45) Date of Patent: Jan. 30, 2018

(54) VEHICLE SHIFTING CONTROL METHOD

(71) Applicant: HYUNDAI MOTOR COMPANY, Seoul (KR)

(72) Inventor: Chan Ho Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/298,284

(22) Filed: Oct. 20, 2016

(65) Prior Publication Data

US 2017/0355363 A1 Dec. 14, 2017

(30) Foreign Application Priority Data

Jun. 9, 2016 (KR) .................. 10-2016-0071891

(51) Int. Cl.
| | |
|---|---|
| B60W 30/19 | (2012.01) |
| B60W 20/15 | (2016.01) |
| B60W 10/02 | (2006.01) |
| B60W 10/08 | (2006.01) |
| B60W 10/11 | (2012.01) |

(52) U.S. Cl.
CPC ............ *B60W 20/15* (2016.01); *B60W 10/02* (2013.01); *B60W 10/08* (2013.01); *B60W 10/11* (2013.01); *B60W 30/19* (2013.01); *B60W 2510/081* (2013.01); *B60W 2510/1005* (2013.01); *B60W 2520/10* (2013.01); *B60W 2540/10* (2013.01); *B60W 2710/021* (2013.01); *B60W 2710/081* (2013.01); *B60W 2710/1005* (2013.01); *B60W 2710/1083* (2013.01)

(58) Field of Classification Search
None
See application file for complete search history.

(56) References Cited

U.S. PATENT DOCUMENTS

| | | | | |
|---|---|---|---|---|
| 5,033,328 A | * | 7/1991 | Shimanaka | ........... B60W 10/06 477/109 |
| 5,899,831 A | * | 5/1999 | Takiguchi | ............. F16H 61/061 475/129 |
| 2004/0214687 A1 | * | 10/2004 | Morisawa | ............. B60W 10/02 477/109 |

(Continued)

FOREIGN PATENT DOCUMENTS

| | | |
|---|---|---|
| JP | 4208550 B2 | 1/2009 |
| JP | 2012-086675 A | 5/2012 |
| KR | 10-2011-0005931 | 1/2011 |

(Continued)

OTHER PUBLICATIONS

Korean Office Action issued in Korean Patent Application No. 10-2016-0071891, dated Sep. 19, 2017.

*Primary Examiner* — Justin Holmes
(74) *Attorney, Agent, or Firm* — McDermott Will & Emery LLP

(57) ABSTRACT

A shifting control method of a vehicle includes inhibiting, by a controller, a line pressure from being increased when the controller senses a power-off upshift condition of the vehicle, calculating, by the controller, a target speed of a motor after the inhibiting step, synchronizing, by the controller, the motor to the target speed after the calculating step, and increasing, by the controller, an oil pressure of an engagement side clutch of a transmission to complete shifting after the synchronizing step.

6 Claims, 2 Drawing Sheets

(56) References Cited

U.S. PATENT DOCUMENTS

2014/0229044 A1* 8/2014 Dai .................. B60W 20/30
  701/22
2016/0031437 A1 2/2016 Bang

FOREIGN PATENT DOCUMENTS

| KR | 10-2011-0037628 A | 4/2011 |
| KR | 10-2011-0116584 A | 10/2011 |
| KR | 10-2012-0056125 A | 6/2012 |
| KR | 10-1567231 B1 | 11/2015 |

* cited by examiner

VEHICLE SHIFTING CONTROL METHOD

CROSS REFERENCE TO RELATED APPLICATION

The present application claims the benefit of priority to Korean Patent Application No. 10-2016-0071891, filed on Jun. 9, 2016 with the Korean Intellectual Property Office, the entire contents of which is incorporated herein for all purposes by this reference.

TECHNICAL FIELD

The present disclosure relates to a vehicle shifting control method capable of reducing a shifting time and increasing fuel efficiency by controlling a line pressure and a motor speed when the vehicle is in a power-off upshift condition.

BACKGROUND

Lift Foot Up (LFU) describes a behavior of a driver taking his or her foot off an accelerator pedal while the driver accelerates, or otherwise operates, a vehicle. In this case, the LFU shifting that is generally generated is upshift shifting and is generated in the situation where an input torque of a transmission is low or reduced to be low, and therefore uses a shifting clutch hydraulic control pattern called power-off upshift.

In this case, a line pressure is generally controlled to be a maximum line pressure to secure uniform shifting quality. A driver expects a feeling that a vehicle is close to neutral when he or she does not decelerate the vehicle upon the LFU shifting. In this case, a shifting control uses a method for performing shifting by reducing an oil pressure of a release side clutch to release the clutch and then increasing an oil pressure of an engagement side clutch at synchronous timing while waiting for the input shaft speed of the transmission to be reduced.

The LFU shifting releases the clutch when a torque is applied to an engine or a motor in an idle state in order to wait for a natural reduction in the input shaft speed, and therefore has a limit in reducing a length of a shifting section, or time.

As such, when the shifting section is long, the section in which the line pressure is kept high is also long, and therefore a reduction in fuel efficiency may occur.

Meanwhile, a production of a vehicle to which an electric oil pump (EOP) is applied has increased in recent years. In this case, an oil pump unit (OCU) is provided to control a driving of the EOP. The OCU receives an oil pump power value corresponding to a target line pressure calculated by a transmission control unit (TCU) to drive the EOP at a speed at which a required line pressure may be generated.

Therefore, it is possible to more efficiently form a target oil pressure of the oil pump as compared with the existing mechanical oil pump (MOP).

When the shifting control is performed, the maximum line pressure is used to minimize an effect of deviation on a hydraulic system, and thus obtain uniform shifting quality. However, when the control for increasing the line pressure to the maximum line pressure for each time shifting is performed, the shifting time is increased and the oil pump is driven, such that fuel efficiency may be reduced.

The matters described as the related art have been provided only for assisting in the understanding for the background of the present disclosure and should not be considered as corresponding to the related art known to those skilled in the art.

SUMMARY

An object of the present disclosure is to provide a shifting control method of a vehicle capable of reducing a shifting time and increasing fuel efficiency by maintaining a line pressure at a lowest pressure while controlling a motor speed when the vehicle is in a power-off upshift condition.

According to an exemplary embodiment of the present disclosure, there is provided a shifting control method of a vehicle, including: inhibiting, by a controller, a line pressure from being increased when the controller senses a power-off upshift condition of a vehicle; calculating, by the controller, a target speed of a motor after the inhibiting step; synchronizing, by the controller, the motor to the target speed after the calculating step; and increasing, by the controller, an oil pressure of an engagement side clutch of a transmission to complete shifting after the synchronizing step.

The shifting control method of a vehicle may further include: determining, by the controller, whether the vehicle is in a power-off upshift stage based on a shifting state and an APS sensing value, prior to performing the increasing step.

In the calculating step, the controller may calculate the target speed of the motor based on at least one of information of a current shift stage, a target shift stage, a vehicle speed and a current motor speed.

In the synchronizing step, the controller may release an engine clutch and then synchronize the motor with the target speed.

In the synchronizing step, the controller may release an oil pressure of a release side clutch of the transmission and then synchronize the motor with the target speed.

In the increasing step, the controller may increase the oil pressure of the engagement side clutch for a set time.

DETAILED DESCRIPTION

Hereinafter, a shifting control method of a vehicle according to an exemplary embodiment of the present disclosure will be described with reference to the accompanying drawings.

Figure 1:
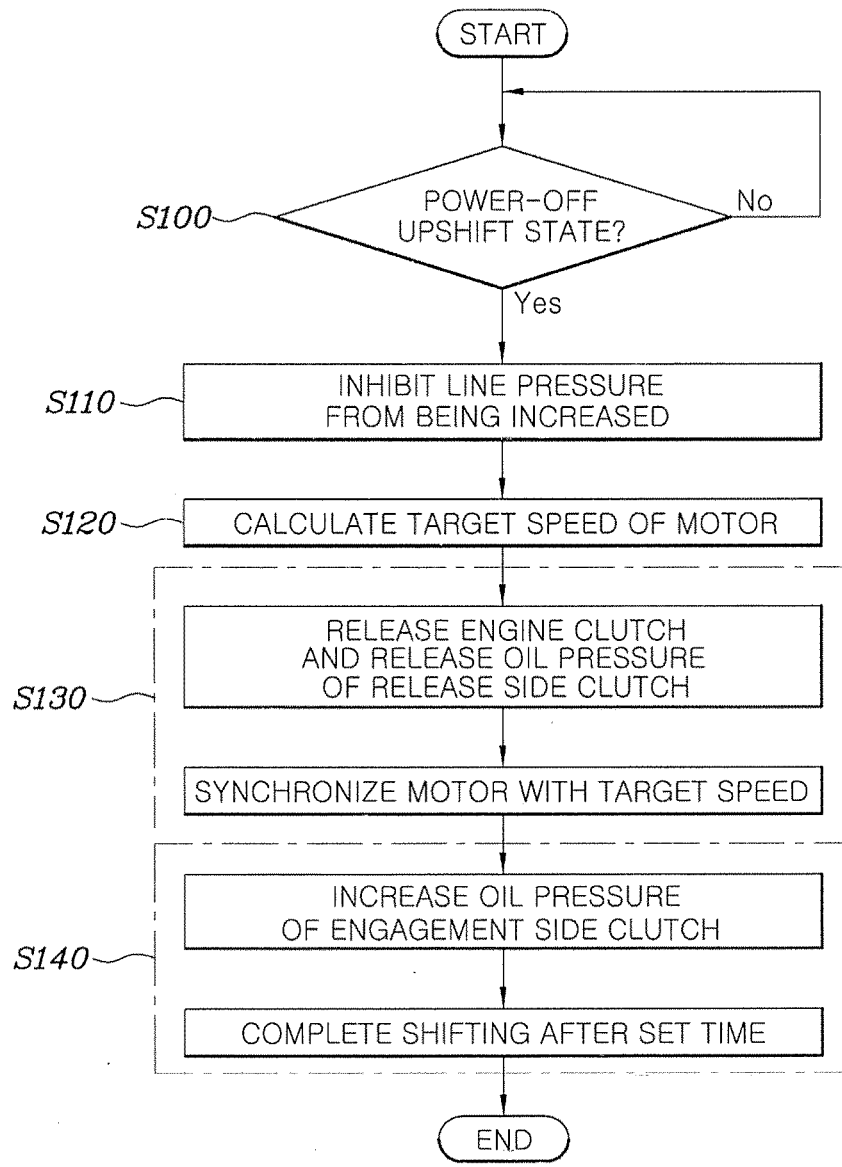
FIG. 1 is a flowchart illustrating a shifting control method of a vehicle according to an exemplary embodiment of the present disclosure.
Figure 2:
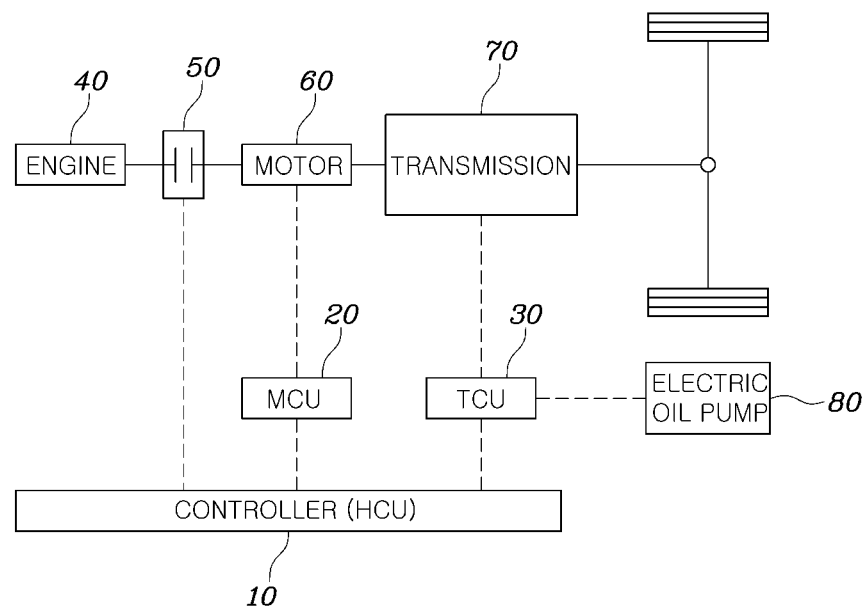
FIG. 2 is a diagram illustrating a shifting control apparatus of a vehicle according to an exemplary embodiment of the present disclosure.

FIG. 1 is a flowchart illustrating a shifting control method of a vehicle according to an exemplary embodiment of the present disclosure and FIG. 2 is a diagram illustrating a shifting control apparatus of a vehicle according to an exemplary embodiment of the present disclosure.

Referring to FIGS. 1 and 2, the shifting control method of a vehicle may include: inhibiting, by a controller 10, a line pressure from being increased when the controller 10 senses a power-off upshift condition of a vehicle (S110); calculating, by the controller 10, a target speed of a motor 60 after the inhibiting (S110) (S120); synchronizing, by the controller 10, the motor 60 to the target speed after the calculating (S120) (S130); and increasing, by the controller 10, an oil pressure of an engagement side clutch of a transmission 70 to complete shifting after the synchronizing (S130) (S140).

According to the related art, to secure uniform shifting quality whenever the shifting of the vehicle is generated, the line pressure is maintained to be a maximum line pressure by driving an electric oil pump (EOP).

However, according to the present disclosure, when an upshift, that is, power-off upshift is generated in a state in which a driver takes his or her foot off an accelerator pedal, an electric oil pump 80 inhibits the line pressure from being increased to reduce a time required for a control of the line pressure and minimize power consumption.

For this purpose, the present disclosure may further include determining, by the controller 10, whether a vehicle is in a power-off upshift stage based on a shifting state and an APS sensing value, prior to performing the maintaining step (S110).

That is, the controller 10 senses the shifting condition on whether the vehicle performs an upshift or downshift using a transmission control unit (TCU) 30 and receives the APS sensing value through an accelerator position sensor (APS) to determine whether a driver takes his or her foot off the accelerator pedal.

For example, when the controller 10 senses a state in which the vehicle is in the upshift state and the driver takes his or her foot off the accelerator pedal using the TCU 30 and the APS, the controller 10 determines that the vehicle is in the power-off upshift condition to perform the inhibiting (S110).

Meanwhile, if only the increase in the line pressure is inhibited, a sufficient oil pressure may not be transferred to the engagement side clutch of the transmission 70, and therefore a rotation speed of the motor may not be smoothly reduced, such that an increase in shifting time and a reduction in shifting quality may occur.

Therefore, according to the present disclosure, the controller 10 may perform the inhibiting (S110) and then control the rotation speed of the motor 60 to be converged to the target speed that is a synchronous speed of a shift stage set as a target, thereby maintaining the line pressure to be low and reducing the time required for the shifting.

That is, the controller 10 actively controls the rotation speed of the motor 60 to be synchronized with the synchronous speed of the target shift stage. Therefore, even though the line pressure is maintained to be the lowest pressure, the controller 10 may perform the shifting without reducing the shifting quality only by the oil pressure of the engagement side clutch.

Here, in the calculating step (S120), the controller 10 may calculate the target speed of the motor 60 based on at least one piece of information of a current shift stage, the target shift stage, a vehicle speed and/or a current motor speed.

The controller 10 allows an MCU 20 to receive the information on the current shift stage and the target shift stage from the TCU 30, and performs a control to receive vehicle speed information from a vehicle speed sensor. The MCU 20 may use the received information to calculate the target speed of the motor 60 and may perform a PI control based on a difference between the calculated target speed and the current motor speed of the motor 60 to calculate the accurate target speed of the motor 60.

To control the motor 60 to reach the target speed as intended, the effect of the engine 40 should be excluded. For this purpose, in the synchronizing step (S130), the controller 10 may release the engine clutch 50 and then synchronize the motor 60 with the target speed. Therefore, the driving force of the engine 40 is not transferred to the input shaft of the motor 60, and therefore the rotation speed of the motor 60 may be precisely controlled.

Here, unlike the engine 40, the motor 60 may immediately apply a torque having a negative value to reduce the rotation speed, and thus the rotation speed may be more rapidly controlled. Further, in the case of the upshift, a control to reduce the motor speed is performed, and therefore the control may be performed even though a state of charge of a battery is low.

As such, even though the line pressure is maintained to be the lowest pressure, the target speed may be synchronized so that the rotation speed of the motor 60 may be synchronized with the target shift stage. Therefore, the shifting may be performed without reducing the shifting quality only by the increase in the oil pressure of the engagement side clutch of the transmission.

Further, in the synchronizing step (S130), the controller 10 may release the oil pressure of the release side clutch of the transmission 70 and then synchronize the motor 60 with the target speed.

That is, if the rotation control of the motor is controlled in the state in which the oil pressure of the release side clutch of the transmission 70 is not exhausted, the torque is transferred to the output shaft and therefore the shifting quality may be reduced. As a result, the control to rapidly exhaust the oil pressure of the release side clutch prior to controlling the rotation speed of the motor 60 is performed, thereby maintaining the shifting quality.

Further, according to the present disclosure, in the completing step (S140), the controller 10 increases the oil pressure of the engagement side clutch for a set time.

Here, the set time may be set to be longer than the existing synchronization time of the engagement side clutch. That is, in the state in which the line pressure is maintained to be the lowest oil pressure, even though the oil pressure of the engagement side clutch is increased, the oil pressure of the engagement side clutch may be more slowly increased than the existing synchronization time of the engagement side clutch. Therefore, the set time that is the time when the oil pressure of the engagement side clutch is increased is set to be longer, thereby preventing the shifting impact from occurring.

According to the shifting control method of a vehicle having the structure as described above, it is possible to minimize the increase in the shifting time and the reduction in the fuel efficiency due to the control in the increase in the line pressure by preventing the line pressure from being increased when the vehicle is in the power-off upshift condition.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. A shifting control method of a vehicle, comprising:
inhibiting, by a controller, a line pressure from being increased when the controller senses a power-off upshift condition of the vehicle;
calculating, by the controller, a target speed of a motor after the inhibiting step;
synchronizing, by the controller, the motor to the target speed after the calculating step; and
increasing, by the controller, an oil pressure of an engagement side clutch of a transmission to complete shifting after the synchronizing step.

2. The shifting control method of a vehicle of claim 1, further comprising:
    determining, by the controller, whether the vehicle is in a power-off upshift stage based on a shifting state and an accelerator position sensor (APS) sensing value, prior to the increasing step.

3. The shifting control method of a vehicle of claim 1, wherein in the calculating step, the controller calculates the target speed of the motor based on a target shift stage and a vehicle speed.

4. The shifting control method of a vehicle of claim 1, wherein in the synchronizing step, the controller releases an engine clutch and then synchronizes the motor with the target speed.

5. The shifting control method of a vehicle of claim 1, wherein in the synchronizing step, the controller releases an oil pressure of a release side clutch of the transmission and then synchronizes the motor with the target speed.

6. The shifting control method of a vehicle of claim 1, wherein in the increasing step, the controller increases the oil pressure of the engagement side clutch for a set time.

\* \* \* \* \*